No. 879,696. PATENTED FEB. 18, 1908.
E. W. J. TREVOR.
NUTSHELL BREAKING AND KERNEL EXTRACTING APPARATUS.
APPLICATION FILED AUG. 10, 1907.

2 SHEETS—SHEET 1.

No. 879,696.　　　　　　　　　　　　　　PATENTED FEB. 18, 1908.
E. W. J. TREVOR.
NUTSHELL BREAKING AND KERNEL EXTRACTING APPARATUS.
APPLICATION FILED AUG. 10, 1907.

2 SHEETS—SHEET 2.

UNITED STATES PATENT OFFICE

EARLE WELLINGTON JENKS TREVOR, OF WESTMINSTER, LONDON, ENGLAND.

NUTSHELL-BREAKING AND KERNEL-EXTRACTING APPARATUS.

No. 879,696.

Specification of Letters Patent.

Patented Feb. 18, 1908.

Application filed August 10, 1907. Serial No. 388,046.

*To all whom it may concern:*

Be it known that I, EARLE WELLINGTON JENKS TREVOR, a subject of the King of England, residing at 78 Palace Chambers, 9 Bridge street, Westminster, in the county of London, England, have invented certain new and useful Improvements in Nutshell-Breaking and Kernel-Extracting Apparatus; and I do hereby declare the following to be a full, clear, and exact description of the invention, such as will enable others skilled in the art to which it appertains to make and use the same.

This invention relates to a nutshell breaking and kernel extracting apparatus, which apparatus consists essentially of an anvil having a slot or space in it through which the kernel of the nut to be broken may pass without injury, but insufficiently large for the nut to pass through whole, and a striking piece which exerts a blow or pressure upon the nut sufficient to break its shell upon the anvil aforesaid and force the kernel to drop through the slot or space, with mechanism for feeding unbroken nuts on to the anvil.

The striking piece may be in the form of one or more blade mounted so as to revolve around an axis, the blade or blades being free to pass through the slot in the anvil which is left open at the end nearest the axle, or it may be of any other suitable form.

One of the chief features of my invention consists in the action of the striker and the formation of the anvil, the sides of the slot in the latter being beveled outwards towards the hopper, or direction in which the nuts are fed into the machine, so that nuts of varying dimensions may be held firmly between the sides of the slot while the blow is being delivered which is to break them. And in order that my said invention may be better understood, I will now proceed to describe the same with reference to the drawings accompanying this specification, in which:—

Figure 1:
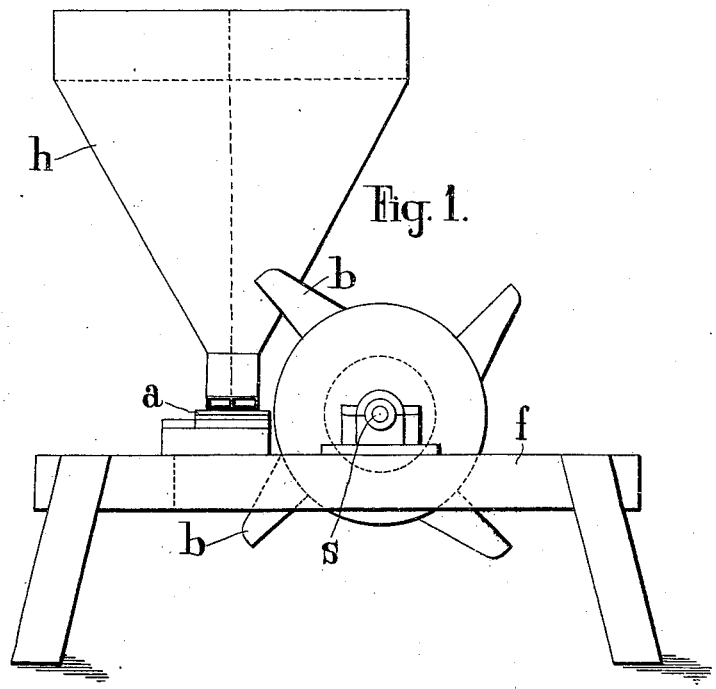
Figure 2:
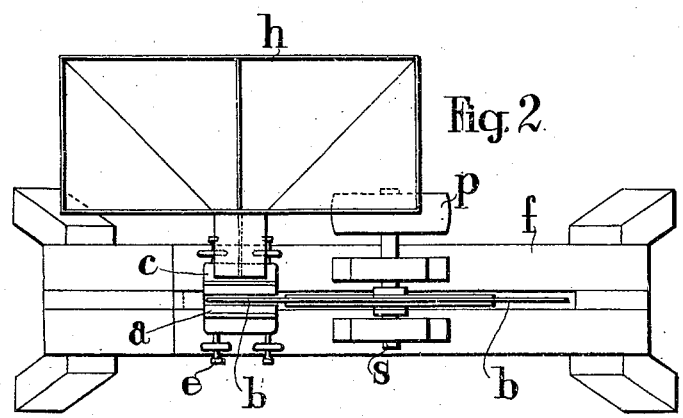
Figure 3:
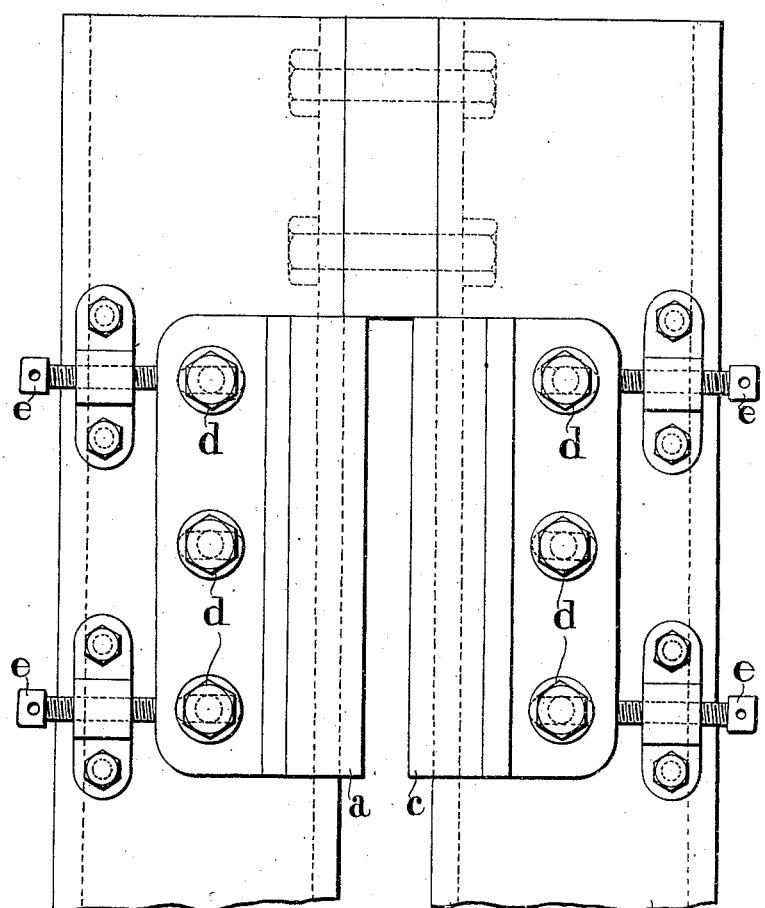
Figure 4:
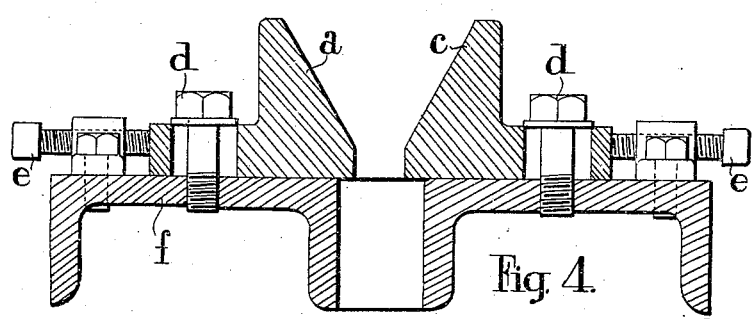

Figure 1 shows an elevation of one form of my machine; Fig. 2 is a plan view of same; Figs. 3 and 4 show details hereinafter referred to.

In Fig. 1 *a* represents an anvil carried upon the frame *f*. This frame *f* also supports the bearings of the shaft *s*, the latter having the striker mounted upon it in a suitable manner, which may be similar to the mounting of a circular saw, the blades *b b* of the striker being free to pass between the jaws *a c* of the anvil, Fig. 2. In these diagrams the striker is shown with 4 blades. *p* is a pulley also mounted upon the shaft *s*, so that the latter may be driven from any convenient source of power.

*h* is a hopper for delivering the nuts on to the anvil *a*.

To enable the machine to deal with nuts of widely various sizes, I construct the anvil in two parts, *a* and *c*, so arranged that the slot or space through which the kernels are to drop may be widened or reduced, and the sides made parallel to one another or held at a slight angle to one another, according to the size of the nuts to be treated and the position on the anvil to which they are to be fed. Figs. 3 and 4 show this anvil in further detail, and a means for adjusting the jaws, Fig. 3 being a plan view, and Fig. 4 a section of the same. In these figures the jaws *a* and *c* are slotted for the reception of the holding-down bolts *d*, the slots being of sufficient length to permit of the two jaws being adjusted by the set screws *e* to such a width apart as may be suitable for the size of nut to be crushed.

In operation these nuts are fed from the hopper *h*, which may be constructed in more than one section, the nuts in each section being as nearly as possible of one size and arranged to fall on a distinct part of the anvil. There may be combined with my apparatus any apparatus of well-known type for sorting or grading the nuts into various sizes and supplying them to a suitable position on the anvil.

The jaws *a c* are adjusted so that the nuts from any particular hopper will not be able to pass through between the jaws in an uncrushed condition at the point where they are delivered, but will remain held between the beveled sides of the anvil. The shaft *s* is then rotated at a high rate of speed, so that the nuts, as they fall between the jaws of the anvil, are forced through the space by the blades *b*, the shells of the nuts being crushed in the process.

In practice I may construct the frame *f* to carry several anvils parallel to one another, the shaft *s* being lengthened to carry a corresponding number of strikers.

What I claim and desire to secure by Letters Patent of the United States of America, is:—

1. In a shell breaking machine, the combination of a pair of anvils, provided with a passage between the same, means for adjusting said anvils, and a striker adapted to be forced through said passage, substantially as described.

2. In a shell breaking machine, the combination of a pair of anvils, provided with slots, and having a passage between the working faces thereof, securing means passing through said slots, means for adjusting said anvils along said slots, and striking means adapted to be forced through said passage, substantially as described.

3. In a shell breaking machine, the combination of a pair of anvils, provided with slots, and having a passage for the shells to pass between the working faces of said anvils, holding bolts, $d$, passing through said slots, setscrews, $e$, for adjusting said anvils along said slots, and striking means adapted to be forced through said passage, substantially as described.

4. In a shell breaking machine, the combination of a pair of anvils, provided with slots, and having a passage for the shells to pass between the working faces of said anvils, holding bolts, $d$, passing through said slots, set screws, $e$, for adjusting said anvils along said slots, striking means consisting of the blades, $b$, adapted to be forced through said passage, and a pulley, $p$, for operating said striking means, substantially as described.

5. In a shell breaking machine, the combination of a pair of anvils, $a$ and $c$, provided with inclined operating faces, and having slots, bolts, $d$, passing through said slots, screws, $e$, for adjusting said anvils along said slots, a frame, $f$, on which the said parts are mounted, said anvils provided with a passage between the same, and said frame, $f$, provided with a passage registering with said first named passage, a hopper, $h$, adapted to contain nuts located in operative relation with said anvils, a series of strikers, $b$, adapted to be forced through said passages and means for operating said strikers, substantially as described.

In testimony whereof, I affix my signature, in presence of two witnesses.

EARLE WELLINGTON JENKS TREVOR.

Witnesses:
 LILY SIMMONDS,
 A. E. VIDAL.